(12) United States Patent
Matsuyama et al.

(10) Patent No.: US 8,881,372 B2
(45) Date of Patent: Nov. 11, 2014

(54) METHOD OF MANUFACTURING A SPINDLE MOTOR

(75) Inventors: Masakazu Matsuyama, Kyoto (JP); Ryosuke Onoe, Kyoto (JP); Kazuhiro Fujitani, Kyoto (JP); Xiang Zhang, Kyoto (JP)

(73) Assignee: Nidec Corporation, Kyoto (JP)

( * ) Notice: Subject to any disclaimer, the term of this patent is extended or adjusted under 35 U.S.C. 154(b) by 103 days.

(21) Appl. No.: 13/424,632

(22) Filed: Mar. 20, 2012

(65) Prior Publication Data

US 2013/0031773 A1 Feb. 7, 2013

(30) Foreign Application Priority Data

Aug. 3, 2011 (JP) .................. 2011-170501

(51) Int. Cl.
  *H02K 15/00* (2006.01)
  *G11B 19/20* (2006.01)
  *H02K 11/00* (2006.01)
  *H02K 3/38* (2006.01)

(52) U.S. Cl.
  CPC ........ *H02K 15/0062* (2013.01); *G11B 19/2009* (2013.01); *H02K 11/0073* (2013.01); *H02K 3/38* (2013.01)
  USPC .......................................... 29/596; 29/592.1

(58) Field of Classification Search
  CPC ........... H02K 3/522; H02K 3/50; H02K 3/52; H02K 15/0062; H02K 15/0068
  USPC ........................................ 29/592.1, 596, 598
  See application file for complete search history.

(56) References Cited

U.S. PATENT DOCUMENTS

| 5,572,381 | A |   | 11/1996 | Stewart |
|---|---|---|---|---|
| 5,705,868 | A | * | 1/1998 | Cox et al. ................. 310/71 |
| 6,118,198 | A |   | 9/2000 | Hollenbeck et al. |
| 6,652,324 | B2 |  | 11/2003 | Maiers et al. |
| 6,771,460 | B2 |  | 8/2004 | Nii et al. |

(Continued)

FOREIGN PATENT DOCUMENTS

| CN | 1496216 A | 5/2004 |
|---|---|---|
| JP | 07-075275 A | 3/1995 |

(Continued)

OTHER PUBLICATIONS

Yawata et al., "Spindle Motor and Storage Disk Drive Apparatus", U.S. Appl. No. 12/849,868, filed Aug. 4, 2010.

(Continued)

*Primary Examiner* — Carl Arbes
(74) *Attorney, Agent, or Firm* — Keating & Bennett, LLP

(57) ABSTRACT

In a method of manufacturing a spindle motor, a sheet preferably made of a thermoplastic resin is closely adhered to an upper surface of a base portion of a spindle motor such that the sheet covers a base hole of the base portion. Next, heat is applied to a region of the sheet which coincides with the base hole to define a sheet hole continuous with the base hole. Thereafter, a coil is arranged over the base portion, and a conducting wire defining the coil is extended through the sheet hole and the base hole to be drawn downwardly out of the base portion. The sheet hole is thus defined after the sheet is closely adhered to the base portion. In addition, the sheet hole is defined by melting the resin through application of the heat. It is therefore easy to arrange the sheet and define the sheet hole.

6 Claims, 8 Drawing Sheets

(56) References Cited

U.S. PATENT DOCUMENTS

| | | | |
|---|---|---|---|
| 7,012,191 | B1 | 3/2006 | Watanabe et al. |
| 7,105,963 | B2 | 9/2006 | Ito et al. |
| 7,144,275 | B2 | 12/2006 | Iida |
| 7,254,882 | B2 | 8/2007 | Ito et al. |
| 7,387,530 | B2 * | 6/2008 | Shinohira et al. .............. 439/519 |
| 7,684,146 | B1 | 3/2010 | Andrikowich et al. |
| 7,757,378 | B1 | 7/2010 | Mann et al. |
| 8,120,217 | B2 | 2/2012 | Yawata et al. |
| 8,120,872 | B2 | 2/2012 | Sekii et al. |
| 8,164,851 | B2 | 4/2012 | Yoneda et al. |
| 8,299,668 | B2 | 10/2012 | Yawata et al. |
| 8,304,945 | B2 | 11/2012 | Yawata et al. |
| 8,324,771 | B2 | 12/2012 | Yawata et al. |
| 8,363,353 | B2 * | 1/2013 | Yawata ...................... 360/99.08 |
| 8,400,729 | B1 | 3/2013 | Watanabe |
| 8,576,512 | B1 * | 11/2013 | Sato et al. ................... 360/99.08 |
| 8,587,896 | B1 * | 11/2013 | Ishino et al. ................ 360/99.08 |
| 8,675,305 | B2 | 3/2014 | Watanabe et al. |
| 8,687,316 | B2 | 4/2014 | Watanabe et al. |
| 2004/0020047 | A1 | 2/2004 | Nishikawa et al. |
| 2005/0206255 | A1 | 9/2005 | Yoshino et al. |
| 2006/0023339 | A1 | 2/2006 | Fukuyama et al. |
| 2006/0138886 | A1 | 6/2006 | Ito et al. |
| 2006/0281229 | A1 | 12/2006 | Koh et al. |
| 2009/0316299 | A1 | 12/2009 | Tashiro et al. |
| 2011/0249362 | A1 | 10/2011 | Saichi et al. |
| 2012/0092792 | A1 | 4/2012 | Sugi et al. |
| 2012/0113546 | A1 | 5/2012 | Sugi et al. |
| 2012/0162818 | A1 | 6/2012 | Sugi et al. |
| 2012/0200957 | A1 | 8/2012 | Yawata |
| 2013/0031773 | A1 | 2/2013 | Matsuyama et al. |
| 2013/0050874 | A1 | 2/2013 | Yawata et al. |

FOREIGN PATENT DOCUMENTS

| | | |
|---|---|---|
| JP | 07-107693 A | 4/1995 |
| JP | 07-222386 A | 8/1995 |
| JP | 07-334967 A | 12/1995 |
| JP | 11-218128 A | 8/1999 |
| JP | 2000-209804 A | 7/2000 |
| JP | 2000-306319 A | 11/2000 |
| JP | 2001-067775 A | 3/2001 |
| JP | 2005-057892 A | 3/2005 |
| JP | 2005-210787 A | 8/2005 |
| JP | 2006-040423 A | 2/2006 |
| JP | 2006-100252 A | 4/2006 |
| JP | 2006-185553 A | 7/2006 |
| JP | 2006-187145 A | 7/2006 |
| JP | 2009-110611 A | 5/2009 |
| JP | 2009-189157 A | 8/2009 |
| JP | 2010-9644 A | 1/2010 |
| JP | 2011-114892 A | 6/2011 |
| JP | 2012-74114 A | 4/2012 |

OTHER PUBLICATIONS

Yawata et al., "Spindle Motor and Storage Disk Drive Apparatus", U.S. Appl. No. 13/352,442, filed Jan. 18, 2012.

Yawata et al., "Spindle Motor and Storage Disk Drive Apparatus", U.S. Appl. No. 13/352,445, filed Jan. 18, 2012.

Saichi et al.,"Spindle Motor Having Connecting Mechanism Connecting Lead Wire and Circuit Board, and Storage Disk Drive Having the Same", U.S. Appl. No. 13/029,143, filed Feb. 17, 2011.

Sugi et al.,"Motor Unit and Disk Drive Apparatus", U.S. Appl. No. 13/290,209, filed Nov. 7, 2011.

Sugi et al.,"Spindle Motor, and Disk Drive Apparatus Including the Spindle Motor", U.S. Appl. No. 13/334,620, filed Dec. 22, 2011.

Yawata, "Spindle Motor, Disk Drive Apparatus, and Method of Manufacturing Spindle Motor", U.S. Appl. No. 13/365,286, filed Feb. 3, 2012.

Watanabe, "Method of Manufacturing Motor, Motor, and Disk Drive Apparatus", U.S. Appl. No. 13/437,103, filed Apr. 2, 2012.

Watanabe et al., "Spindle Motor and Disk Drive Apparatus", U.S. Appl. No. 61/625,128, filed Apr. 17, 2012.

Watanabe et al., "Base Unit, Spindle Motor, and Disk Drive Apparatus", U.S. Appl. No. 61/625,132, filed Apr. 17, 2012.

Sugi et al.,"Spindle Motor, Disk Drive Apparatus, and Method of Manufacturing Spindle Motor", U.S. Appl. No. 13/241,773, filed Sep. 23, 2011.

Sekii et al., "Spindle Motor and Disk Drive Apparatus", U.S. Appl. No. 12/952,319, filed Nov. 23, 2010.

Taki et al.; "Spindle Motor for Use in Disk Drive Apparatus and Disk Drive Apparatus, Disk Drive Apparatus, and Method of Manufacturing Spindle Motor"; U.S. Appl. No. 14/250,739; filed Apr. 11, 2014.

Taki et al.; "Spindle Motor for Use in Disk Drive Apparatus, and Disk Drive Apparatus"; U.S. Appl. No. 14/265,508; filed Apr. 30, 2014.

* cited by examiner

METHOD OF MANUFACTURING A SPINDLE MOTOR

BACKGROUND OF THE INVENTION

1. Field of the Invention

The present invention relates to a method of manufacturing a spindle motor, the spindle motor, and a disk drive apparatus including the spindle motor.

2. Description of the Related Art

Conventional hard disk drives typically have spindle motors arranged to rotate magnetic disks installed therein. Such a spindle motor includes a stationary portion and a rotating portion. The stationary portion is fixed to a housing of the drive. The rotating portion is arranged to rotate while supporting a magnetic disk. The spindle motor is arranged to generate a torque centered on a central axis through magnetic flux generated between the stationary portion and the rotating portion, so that the rotating portion is caused to rotate with respect to the stationary portion.

The stationary portion of the spindle motor includes coils arranged to generate the magnetic flux. Conducting wires which define the coils are drawn out of the spindle motor, and soldered to a circuit board. For example, paragraph [0021] of JP-A 2010-009644 states that lead wires, which are drawn from the coils, are led out of a housing through a through hole defined in a base plate, and then connected to a circuit board through a connector.

In addition, a sealing sheet including an insert hole is arranged on an inside of the base plate described in JP-A 2010-009644. The lead wires are drawn out through the insert hole of the sealing sheet and the through hole of the base plate (see paragraphs [0022] to [0027] of JP-A 2010-009644). With the above-described structure, as described in paragraph [0028] of JP-A 2010-009644, it is desirable that the sealing sheet should be arranged such that a center of the insert hole of the sealing sheet and a center of the through hole of the base plate coincide with each other.

SUMMARY OF THE INVENTION

In recent years, there has been a demand for a decrease in the size of a through hole of a base plate in order to improve airtightness of a disk drive apparatus. The above-described operation is made more difficult when the size of the through hole of the base plate is decreased. In addition, the decrease in the size of the through hole of the base plate makes it difficult to keep the conducting wires out of contact with the base plate.

Preferred embodiments of the present invention provide a method of attaching a sealing sheet to a base plate while positioning an insert hole of the sealing sheet and a through hole of the base plate properly relative to each other even when the through hole has a small size.

According to a first preferred embodiment of the present invention, a method of manufacturing a spindle motor including the following steps a), b), c), and d) is provided. In step a), a metallic member is prepared. The metallic member preferably includes a base portion and a base hole. The base portion is arranged to extend radially around a central axis extending in a vertical direction. The base hole is arranged to extend through the base portion in an axial direction. In step b), which is performed after step a), a sheet, preferably made of, for example, a thermoplastic resin, is arranged on an upper surface of the base portion such that the sheet is closely adhered to the upper surface of the base portion. The sheet preferably made of the thermoplastic resin is arranged to cover the base hole. In step c), which is performed after step b), heat is preferably applied to at least a region of the sheet which coincides with the base hole to define a sheet hole that is continuous with the base hole. In step d), which is performed after step c), a coil is preferably arranged over the base portion and a conducting wire defining the coil is then passed through the sheet hole and the base hole to be drawn downwardly out of the base portion.

According to a second preferred embodiment of the present invention, a spindle motor including a stationary portion and a rotating portion is provided. The rotating portion is preferably supported to be rotatable about a central axis extending in a vertical direction with respect to the stationary portion. The stationary portion preferably includes a base portion made of, for example, a metal, a sheet made of, for example, a thermoplastic resin, and a coil. The base portion is arranged to extend radially around the central axis. The sheet is closely adhered to an upper surface of the base portion. The coil is arranged over the base portion. The base portion preferably includes a base hole arranged to extend through the base portion in an axial direction. The sheet includes a sheet hole and an annular edge portion. The sheet hole is preferably arranged to be continuous with the base hole. The annular edge portion is arranged around a periphery of the sheet hole. The annular edge portion is preferably arranged to have an axial thickness greater than that of a remaining portion of the sheet. A conducting wire defining the coil is arranged to pass through the sheet hole and the base hole to reach a lower side of the base portion.

According to the first preferred embodiment of the present invention, the sheet hole is preferably defined after the sheet is closely adhered to the base portion. Therefore, there is no need for precise positioning of the base hole and the sheet hole when the sheet is closely adhered to the base portion. In addition, the sheet made of the thermoplastic resin is locally melted through application of the heat to define the sheet hole. Therefore, it is easy to arrange the sheet and define the sheet hole. Moreover, the annular edge portion, which is arranged to have an axial thickness greater than that of a remaining portion of the sheet, is defined around the sheet hole. This contributes to preventing a contact between the base portion and the conducting wire, which is drawn out through the sheet hole.

According to the second preferred embodiment of the present invention, the annular edge portion contributes to improving a strength of the sheet around the sheet hole. Thus, even if the conducting wire is pressed against the annular edge portion, the annular edge portion does not bend easily. Therefore, contact between the conducting wire and the base portion is effectively prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a vertical direction is defined as a direction in which a central axis extends, and that a side on which coils are arranged with respect to a base portion is defined as an upper side. The shape of each member or portion and relative positions of different members or portions will be described based on the above assumptions. It should be noted, however, that the above definitions of the vertical direction and the upper and lower sides are made simply for the sake of convenience in description, and should not be construed to restrict in any way the orientation of a spindle motor or a disk drive apparatus according to any preferred embodiment of the present invention when in actual use.

Figure 1:
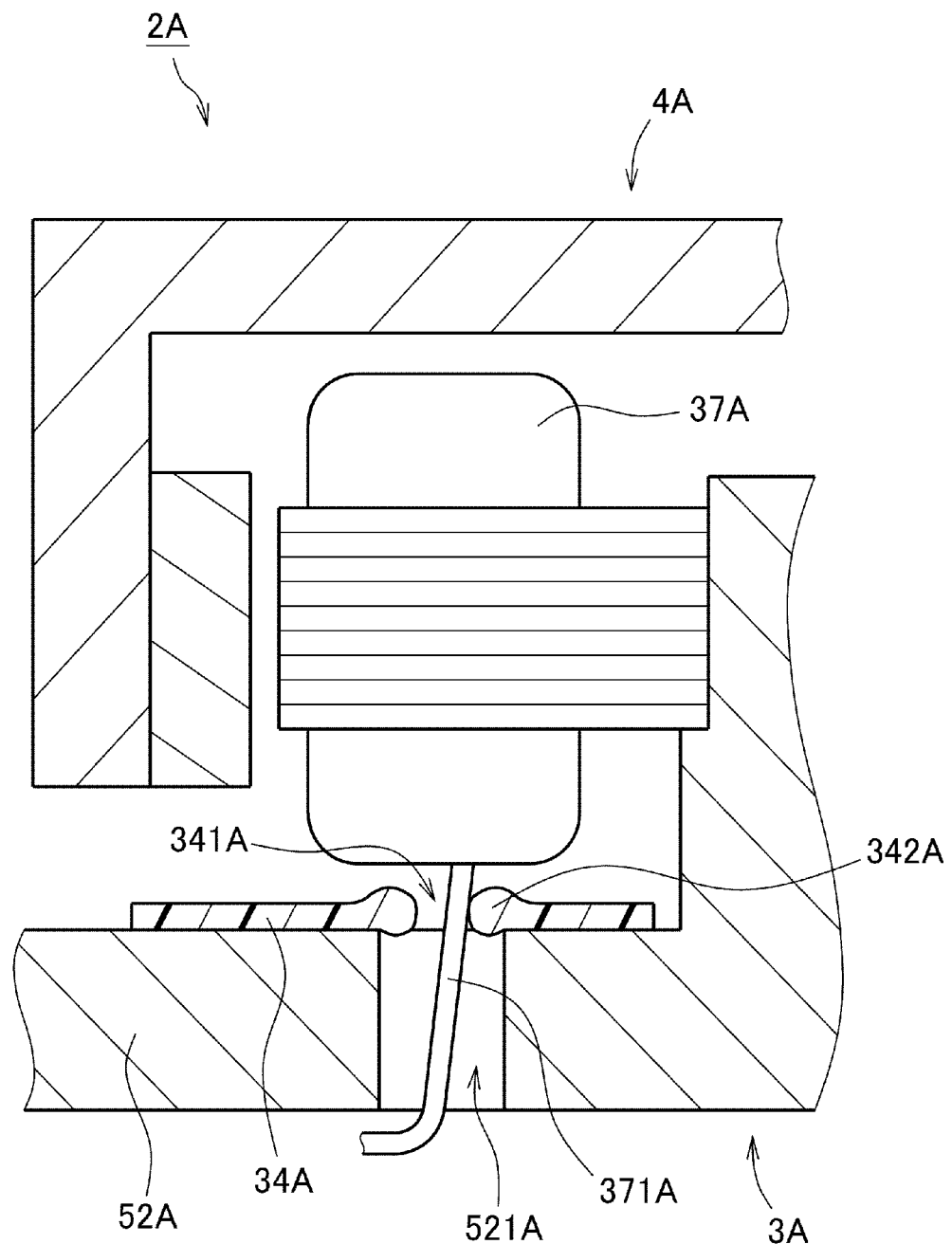
FIG. 1 is a partial vertical cross-sectional view of a spindle motor according to a preferred embodiment of the present invention.

FIG. 1 is a partial vertical cross-sectional view of a spindle motor 2A according to a preferred embodiment of the present invention. As illustrated in FIG. 1, the spindle motor 2A includes a stationary portion 3A and a rotating portion 4A. The rotating portion 4A is preferably supported to be rotatable about a central axis extending in a vertical direction with respect to the stationary portion 3A.

The stationary portion 3A preferably includes a base portion 52A made of, for example, a metal, a sheet 34A made of, for example, a thermoplastic resin, and a coil 37A. The base portion 52A is arranged to extend radially around the central axis. Note that the terms "radial direction", "radial", and "radially" as used herein refer to directions perpendicular or substantially perpendicular to the central axis. The sheet 34A is closely adhered to an upper surface of the base portion 52A. The coil 37A is arranged over the base portion 52A.

The base portion 52A includes a base hole 521A arranged to extend therethrough in an axial direction. Note that the terms "axial direction", "axial", and "axially" as used herein refer to a direction along or substantially along the central axis. The sheet 34A includes a sheet hole 341A and an annular edge portion 342A. The sheet hole 341A is arranged to be continuous with the base hole 521A. That is, the sheet hole 341A is preferably at least partially co-axial with the base hole 521A. The annular edge portion 342A is arranged around a periphery of the sheet hole 341A. The annular edge portion 342A is preferably arranged to have an axial thickness greater than an axial thickness of a remaining portion of the sheet 34A. A conducting wire 371A which defines the coil 37A is arranged to pass through the sheet hole 341A and the base hole 521A to reach a lower side of the base portion 52A.

When the spindle motor 2A is manufactured, a metallic member including the base portion 52A and the base hole 521A is first prepared. Next, the sheet 34A is arranged on the upper surface of the base portion 52A such that the sheet 34A is preferably closely adhered to the upper surface of the base portion 52A such that the sheet covers the base hole 521A. Next, heat is preferably applied to at least a region of the sheet 34A which coincides with the base hole 521A to thereby define the sheet hole 341A in the sheet 34A. Thereafter, the coil 37A is arranged over the base portion 52A. Moreover, the conducting wire 371A which defines the coil 37A is drawn downwardly out of the base portion 52A through both the sheet hole 341A and the base hole 521A.

As described above, in the present preferred embodiment, the sheet hole 341A is preferably defined only after the sheet 34A is closely adhered to the base portion 52A. This substantially eliminates a need for precise positioning of the base hole 521A and the sheet hole 341A when the sheet 34A is closely adhered to the base portion 52A. Moreover, the sheet hole 341A is defined by melting a portion of the sheet 34A, which is preferably made of the thermoplastic resin, through application of the heat. Therefore, it is easy to arrange the sheet 34A and define the sheet hole 341A therein.

Furthermore, the annular edge portion 342A is defined around the sheet hole 341A. This annular edge portion 342A contributes toward improving a strength of the sheet 34A around the sheet hole 341A. Accordingly, even if the conducting wire 371A is pressed against the annular edge portion 342A, the annular edge portion 342A does not bend easily. Therefore, a contact of the conducting wire 371A with the base portion 52A is effectively prevented by the annular edge portion 342A. Furthermore, the annular edge portion 342A is preferably arranged to be usable as a guide when the conducting wire 371A is passed through the sheet hole 341A. This facilitates an operation of passing the conducting wire 371A through the sheet hole 341A.

Next, a more specific preferred embodiment of the present invention will now be described below.

Figure 2:
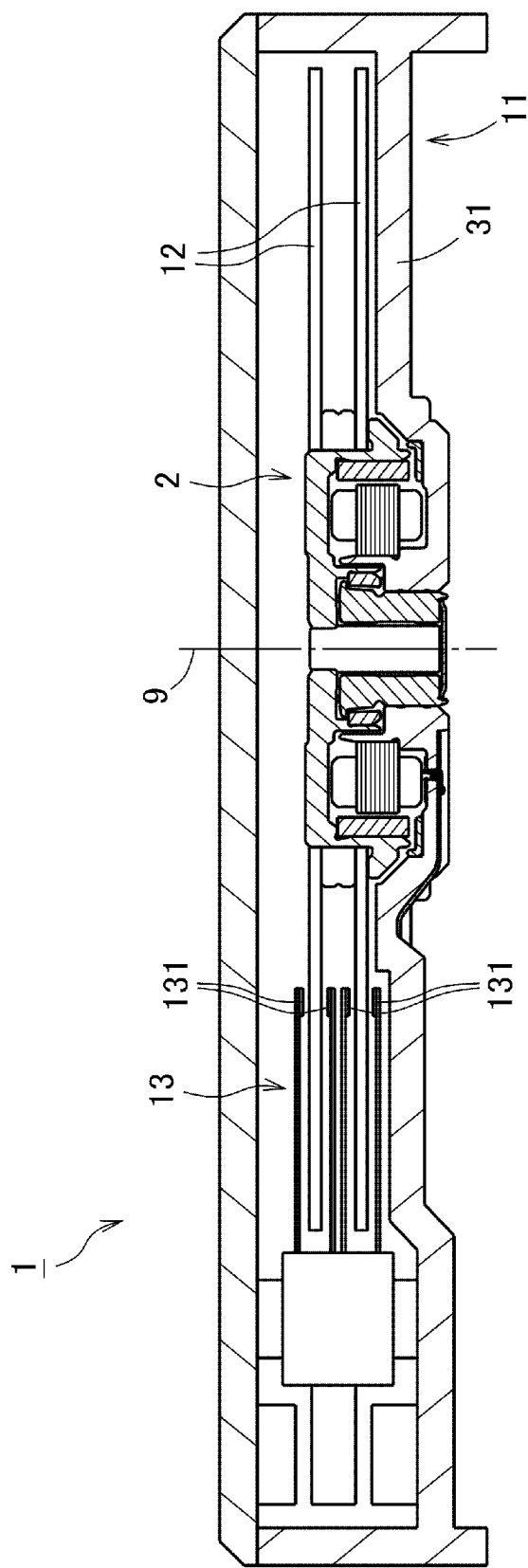
FIG. 2 is a vertical cross-sectional view of a disk drive apparatus according to a preferred embodiment of the present invention.

FIG. 2 is a vertical cross-sectional view of a disk drive apparatus 1 according to a preferred embodiment of the present invention. The disk drive apparatus 1 is an apparatus arranged to perform reading and writing of information from or to magnetic disks 12 while rotating the magnetic disks 12. As illustrated in FIG. 2, the disk drive apparatus 1 preferably includes a housing 11, the magnetic disks 12, which are, for example, two in number, an access portion 13, and a spindle motor 2. Note that the number of magnetic disks included in the disk drive apparatus 1 may be one or any other desirable number more than two.

The housing 11 is a case arranged to contain the two magnetic disks 12, the access portion 13, and the spindle motor 2. The spindle motor 2 is arranged to rotate the two magnetic disks 12 about a central axis 9 while supporting the magnetic disks 12. The access portion 13 is arranged to move a head 131 along a recording surface of each magnetic disk 12 to perform the reading and the writing of information from or to the magnetic disk 12. Note that the access portion 13 may alternatively be arranged to perform only one of the reading and the writing of information from or to the magnetic disks 12.

Figure 3:
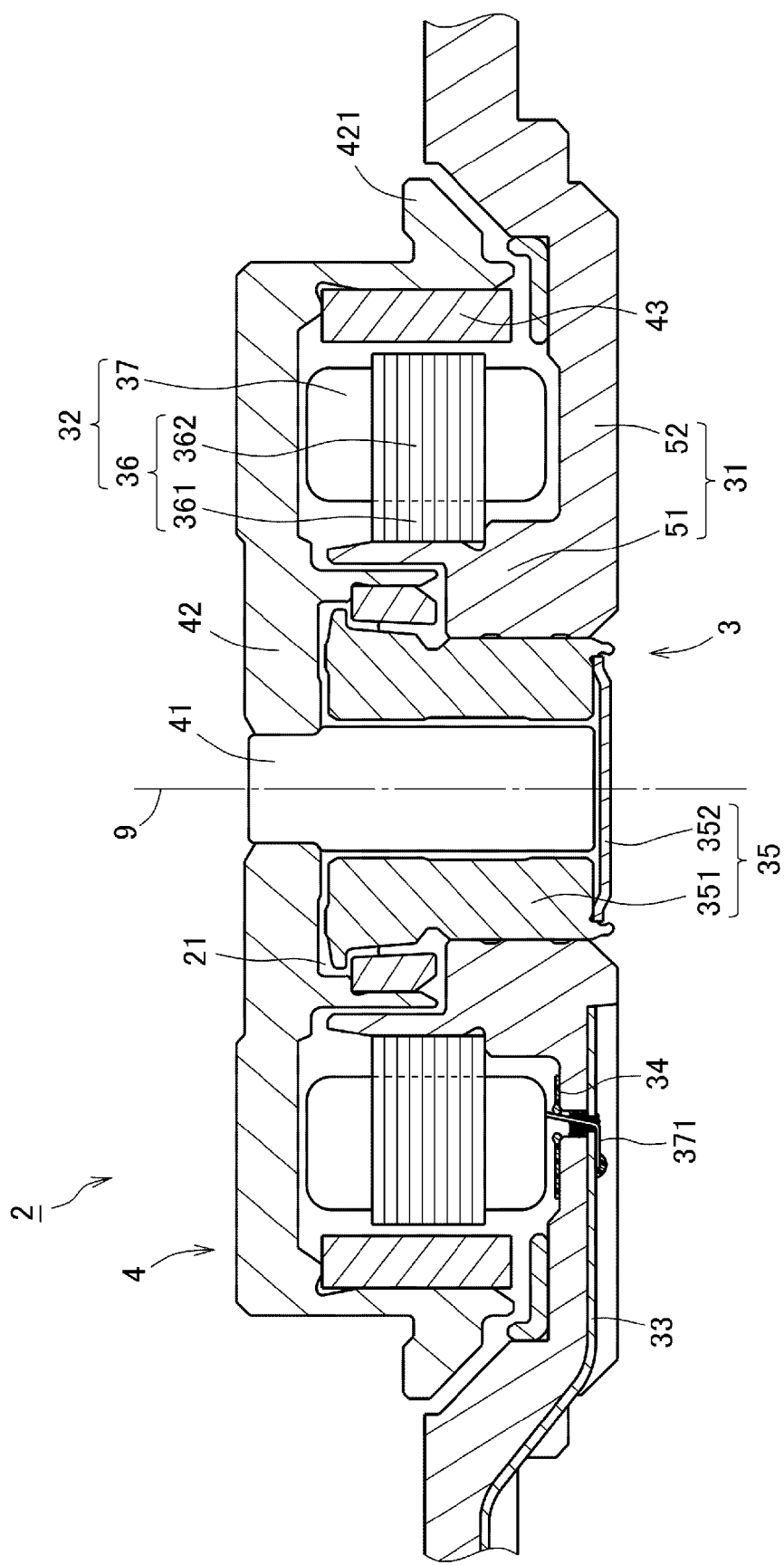
FIG. 3 is a vertical cross-sectional view of a spindle motor according to a preferred embodiment of the present invention.

Next, the structure of the spindle motor 2 will now be described below. FIG. 3 is a vertical cross-sectional view of the spindle motor 2 in accordance with a preferred embodiment of the present invention. As illustrated in FIG. 3, the spindle motor 2 includes a stationary portion 3 and a rotating portion 4. The stationary portion 3 is arranged to remain stationary relative to the housing 11 of the disk drive apparatus 1. The rotating portion 4 is supported to be rotatable with respect to the stationary portion 3.

The stationary portion 3 according to the present preferred embodiment preferably includes a base member 31, a stator unit 32, a circuit board 33, an insulation sheet 34, and a stationary bearing unit 35.

The base member 31 is preferably arranged to define a bottom portion and a side portion of the housing 11. Each of the stator unit 32 and the stationary bearing unit 35 is preferably arranged to be supported by the base member 31. The base member 31 is preferably provided, for example, by casting a metal such as aluminum, an aluminum alloy, etc. As illustrated in FIG. 3, the base member 31 preferably includes a cylindrical portion 51 and a base portion 52. The cylindrical portion 51 is preferably a substantially cylindrical portion which is arranged around the central axis 9. The base portion 52 is preferably a substantially plate-shaped portion which is arranged to extend radially outward from a lower end portion of the cylindrical portion 51.

The stator unit 32 includes a stator core 36 and a plurality of coils 37. The stator core 36 is preferably defined by laminated steel sheets, i.e., a plurality of steel sheets placed one upon another in an axial direction. However, other materials and methods for making the stator core 36 could alternately be used if so desired. The stator core 36 preferably includes an annular core back 361 and a plurality of teeth 362 arranged to project radially outward from the core back 361. The core back 361 is fixed to the cylindrical portion 51 of the base member 31. The teeth 362 are arranged at substantially regular intervals in a circumferential direction.

The coils 37 are arranged over the base portion 52 of the base member 31. Each of the coils 37 is preferably defined by a conducting wire 371 wound around a separate one of the teeth 362. The conducting wire 371 is drawn downwardly out of the base portion 52, and connected to a lower surface of the circuit board 33.

The circuit board 33 is preferably fixed to a lower surface of the base portion 52 through an adhesive, for example. In the present preferred embodiment, a flexible printed circuit (FPC) board, which is flexibly bendable, is preferably used as the circuit board 33. Note that a rigid printed circuit board, which has a low flexibility, may alternatively be used as the circuit board 33 instead of the flexible printed circuit board if so desired.

The insulation sheet 34 is attached to an upper surface of the base portion 52 in order to prevent a contact of each conducting wire 371 with the base portion 52. A lower surface of the insulation sheet 34 and the upper surface of the base portion 52 are preferably closely adhered to each other. The insulation sheet 34 according to the present preferred embodiment is preferably made of polyethylene terephthalate (PET), which is a thermoplastic resin. Note that other thermoplastic resins, such as, for example, polyamide (PA), polybutylene terephthalate (PBT), polyphenylene sulfide (PPS), etc., may be used instead of polyethylene terephthalate. The resin from which the insulation sheet 34 is made preferably has a melting point lower or substantially lower than that of the metal of which the base member 31 is made.

The stationary bearing unit 35 is a mechanism arranged to rotatably support a shaft 41, which defines a portion of the rotating portion 4. The stationary bearing unit 35 preferably includes a sleeve 351 and a cap 352. The sleeve 351 is a substantially cylindrical member which is arranged to surround an outer circumferential surface of the shaft 41. The sleeve 351 is fixed to an inside of the cylindrical portion 51 of the base member 31. The cap 352 is arranged to close an opening defined in a bottom portion of the sleeve 351. A gap defined between an inner circumferential surface of the sleeve 351 and an outer circumferential surface of the shaft 41, and a gap defined between an upper surface of the cap 352 and a lower surface of the shaft 41, are preferably filled with a lubricating oil 21.

The rotating portion 4 according to the present preferred embodiment includes the shaft 41, a hub 42, and a rotor magnet 43.

The shaft 41 is arranged to extend in the vertical direction along the central axis 9. The shaft 41 is arranged to be inserted inside the sleeve 351 and rotatably supported by the stationary bearing unit 35. The hub 42 is preferably a member which is fixed to the shaft 41 and arranged to rotate together with the shaft 41. An outer circumferential portion of the hub 42 preferably includes a disk support portion 421 arranged to support the magnetic disks 12.

The rotor magnet 43 is preferably an annular magnet fixed to the hub 42. An inner circumferential surface of the rotor magnet 43 is arranged radially opposite radially outer end surfaces of the teeth 362. In addition, the inner circumferential surface of the rotor magnet 43 is arranged to define a pole surface on which north and south poles alternate with each other in the circumferential direction.

Regarding the spindle motor 2 having the above-described structure, once electrical drive currents are supplied to the coils 37 through the circuit board 33, radial magnetic flux is generated around the teeth 362 of the stator core 36. Then, interaction between the magnetic flux of the teeth 362 and magnetic flux of the rotor magnet 43 produces a circumferential torque, so that the rotating portion 4 is caused to rotate about the central axis 9 with respect to the stationary portion 3. The magnetic disks 12 supported by the disk support portion 421 of the hub 42 are caused to rotate about the central axis 9 together with the rotating portion 4.

Figure 4:
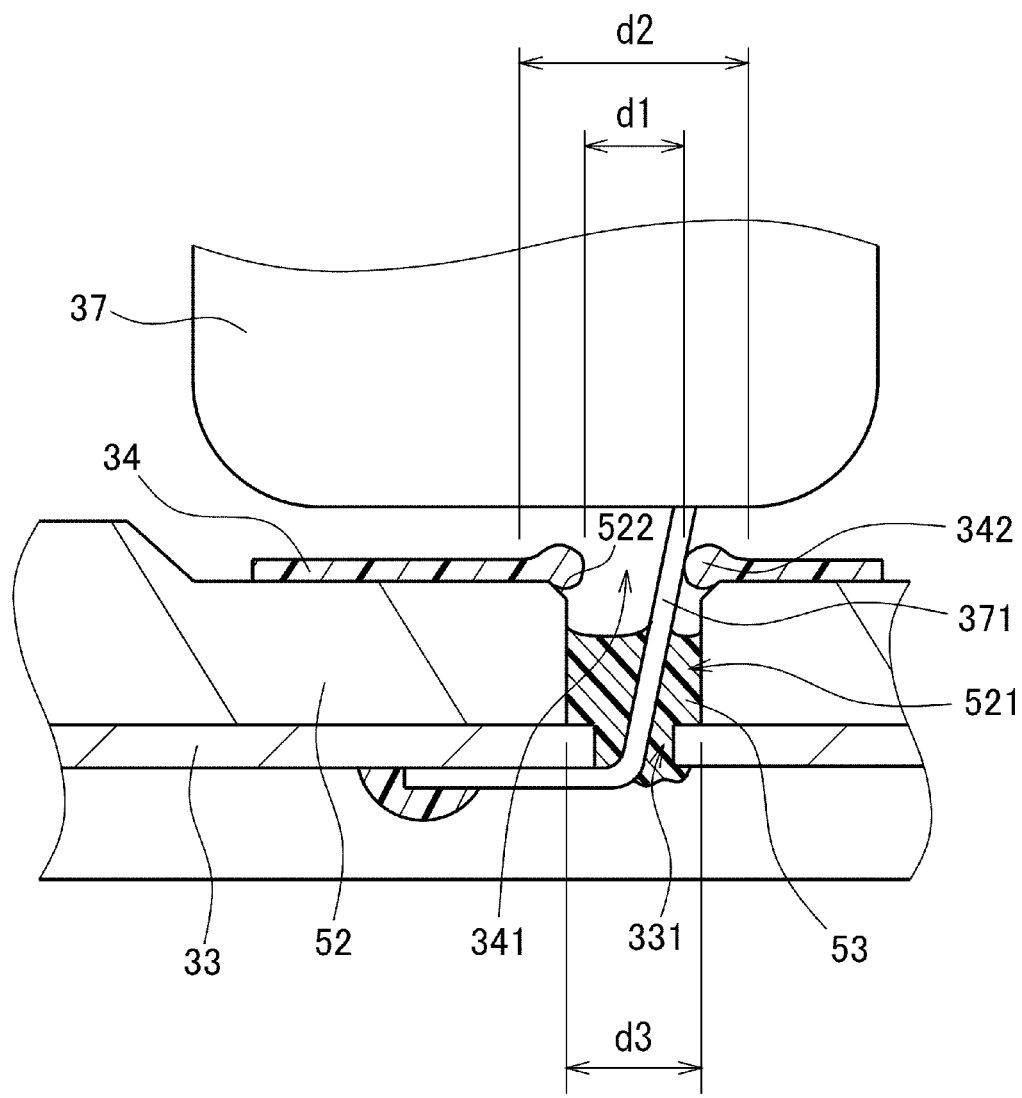
FIG. 4 is a partial vertical cross-sectional view of a stationary portion, illustrating an insulation sheet and an adjacent area, according to a preferred embodiment of the present invention.

Next, the structure of the insulation sheet 34 and an adjacent area will now be described below. FIG. 4 is a partial vertical cross-sectional view of the stationary portion 3 in accordance with a preferred embodiment of the present invention, illustrating the insulation sheet 34 and the adjacent area.

As illustrated in FIG. 4, the base portion 52 includes a base hole 521 through which the conducting wire 371 is extended. The base hole 521 is arranged to extend through the base portion 52 in the axial direction preferably directly under one of the coils 37. The circuit board 33 includes a board hole 331 arranged to be continuous with the base hole 521. The board hole 331 is arranged to extend through the circuit board 33 in the axial direction at a position overlapping in the axial direction with the base hole 521. That is, the board hole 331 is preferably at least partially co-axial with the base hole 521.

The insulation sheet 34 includes a sheet hole 341 arranged to be continuous with the base hole 521. The sheet hole 341 is arranged to extend through the insulation sheet 34 in the axial direction at a position overlapping in the axial direction with the base hole 521. That is, the sheet hole 341 is preferably at least partially co-axial with the base hole 521. The conducting wire 371 which defines the coil 37 is preferably arranged to extend through each of the sheet hole 341, the base hole 521, and the board hole 331 to thereby reach a lower side of the circuit board 33. A lower end portion of the conducting wire 371 is preferably soldered to the lower surface of the circuit board 33 to be electrically connected thereto.

As illustrated in FIG. 4, the diameter d1 of the sheet hole 341 is preferably smaller than the diameter d3 of the base hole 521. The insulation sheet 34 is accordingly arranged to prevent or substantially prevent the conducting wire 371 from coming into direct contact with the base portion 52 in the base hole 521. This contributes to preventing damage of an insulating film with which the conducting wire 371 is coated. Moreover, even if the insulating film with which the conducting wire 371 is coated suffers some damage, an electrical short circuit between the conducting wire 371 and the base portion 52 is prevented or substantially prevented because the conducting wire 371 and the base portion 52 are preferably prevented from coming into direct contact with each other.

The insulation sheet 34 preferably includes an annular edge portion 342 arranged around a periphery of the sheet hole 341. The axial thickness of the annular edge portion 342 is preferably greater than that of a remaining portion of the insulation sheet 34. A process of defining the annular edge portion 342 will be described later. The annular edge portion 342 is obtained as a result of defining the sheet hole 341 through heating and melting of the resin. Therefore, the fact that the sheet hole 341 has been defined through the heating and melting of the resin results in the provision of the annular edge portion 342 and its being defined around the periphery of the sheet hole 341.

The annular edge portion 342 is arranged to contribute to improving a strength of the insulation sheet 34 around the sheet hole 341. Therefore, even if the conducting wire 371 is pressed against the annular edge portion 342, the annular edge portion 342 does not bend easily. This preferably contributes to more effectively preventing contact between the conducting wire 371 and the base portion 52. In particular, the annular edge portion 342 according to the present preferred embodiment is arranged to bulge both upward and downward around the sheet hole 341 due to the annular edge 342 preferably being thicker than other portions of the insulation sheet 34. This contributes to further improving the strength of the insulation sheet 34 around the sheet hole 341.

The base portion 52 preferably includes an inclined surface 522 arranged around an upper end opening of the base hole 521. The inclined surface 522 is inclined so that the base hole 521 will increase in diameter with increasing height. In the present preferred embodiment, the inclined surface 522 and the annular edge portion 342 of the insulation sheet 34 are arranged to overlap with each other in a plan view. That is, the annular edge portion 342 is supported on the inclined surface 522. Bending of the annular edge portion 342 is thereby preferably more effectively prevented.

Furthermore, as illustrated in FIG. 4, the annular edge portion 342 is preferably arranged to have an outside diameter d2 that is greater than the diameter d3 of the base hole 521. This makes it possible to further improve the strength of the annular edge portion 342 by increasing the radial dimension of the annular edge portion 342 while ensuring a sufficient diameter d1 of the sheet hole 341.

Furthermore, in the present preferred embodiment, an adhesive 53 is preferably arranged in the base hole 521 and the board hole 331. The base hole 521 and the board hole 331 are thereby preferably sealed with the adhesive 53, so that communication between an interior and an exterior of the housing is broken off. Furthermore, the conducting wire 371 is preferably fixed in the base hole 521 because of the adhesive 53. Accordingly, contact between the conducting wire 371 and the base portion 52 is thereby more securely prevented.

Figure 5:
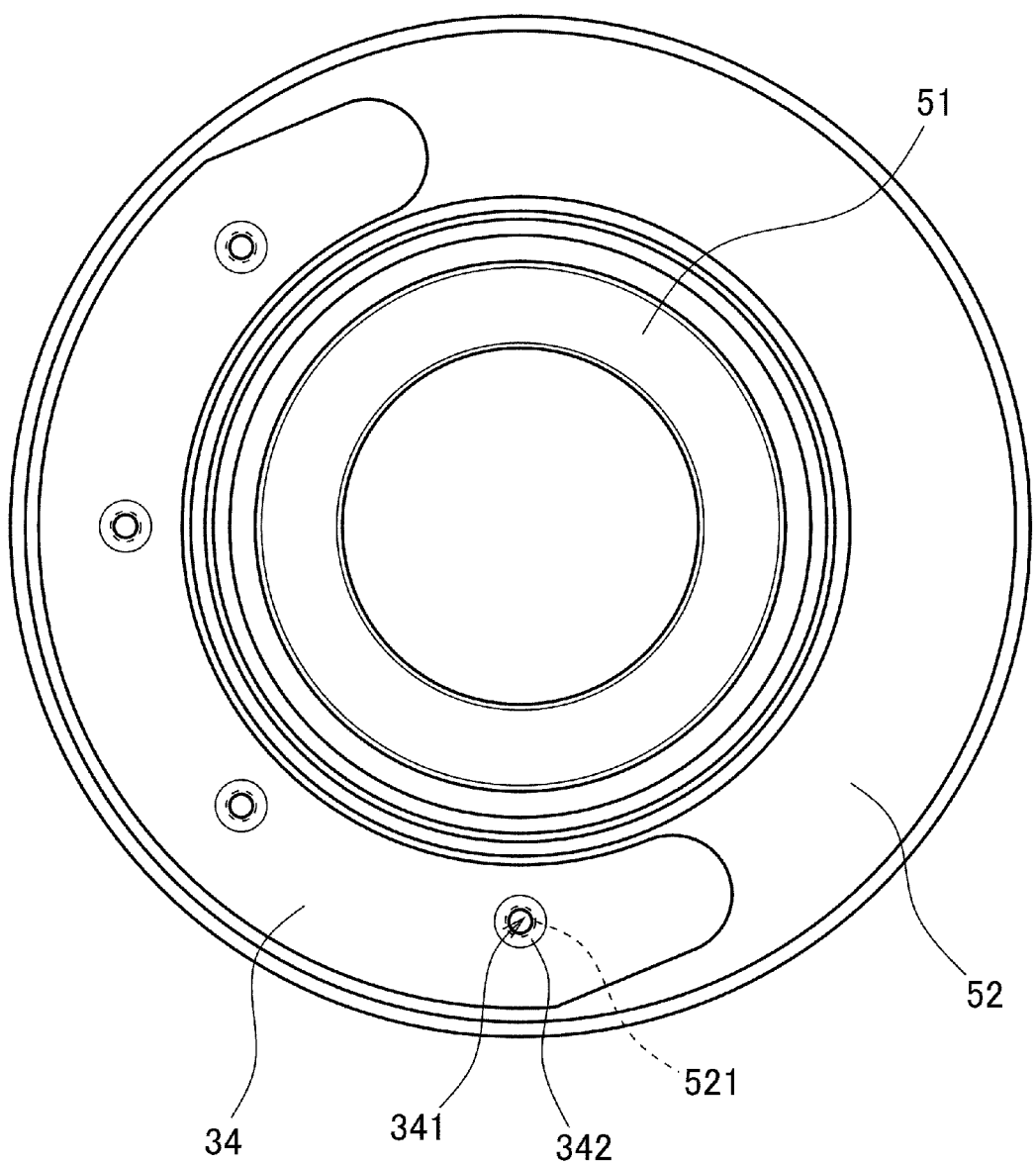
FIG. 5 is a top view of a base portion and the insulation sheet according to a preferred embodiment of the present invention.

FIG. 5 is a top view of the base portion 52 and the insulation sheet 34. As illustrated in FIG. 5, in the present preferred embodiment, the base portion 52 preferably includes four base holes 521. The four base holes 521 are arranged in the circumferential direction radially outward of the cylindrical portion 51. Through each of the four base holes 521, a separate one of conducting wires 371 which preferably correspond to a U phase, a V phase, a W phase, and common, respectively, is arranged to extend. A common wire preferably includes three conducting wires which correspond to the U phase, the V phase, and the W phase, respectively, each of the three conducting wires being electrically joined to one another to thereby be regarded as a single conducting wire.

The insulation sheet 34 is preferably arranged to extend substantially in the shape of a circular arc in the plan view to cover the aforementioned four base holes 521. In addition, the insulation sheet 34 includes four sheet holes 341 each of which is arranged to be continuous with a separate one of the base holes 521. Moreover, the annular edge portion 342 is defined around each sheet hole 341. The strength of the insulation sheet 34 is thereby improved around each of the sheet holes 341.

Figure 6:
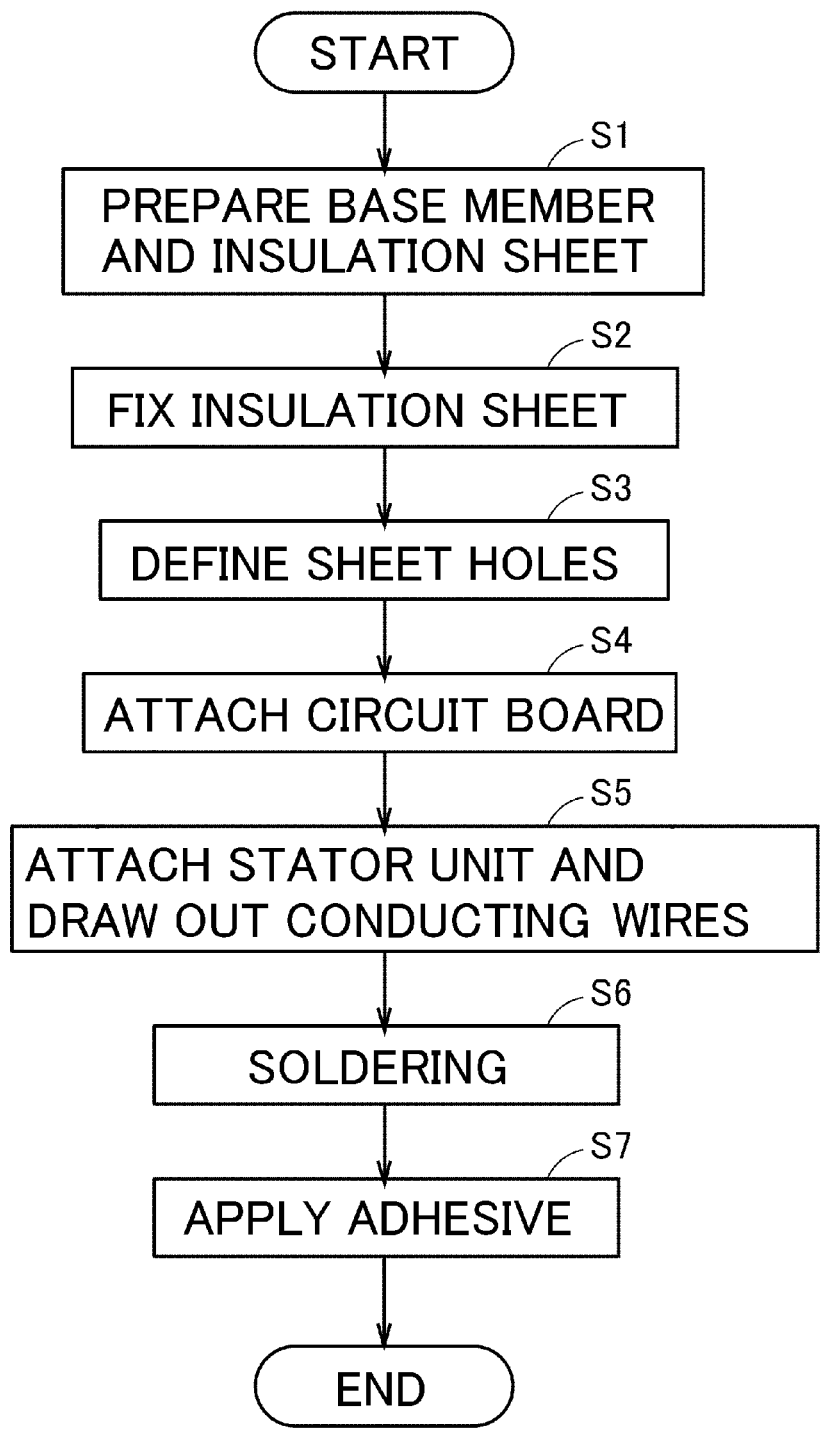
FIG. 6 is a flowchart illustrating a portion of a procedure of manufacturing the spindle motor according to a preferred embodiment of the present invention.

FIG. 6 is a flowchart illustrating a portion of a procedure for manufacturing the above-described spindle motor 2 in accordance with a preferred embodiment of the present invention. Of the procedure of manufacturing the spindle motor 2, processes involved with the drawing out of the conducting wires 371 will now be described below with reference to FIG. 6.

In an example of a procedure for manufacturing a spindle motor as shown in FIG. 6, the base member 31, which includes the base portion 52, and the insulation sheet 34 made of the thermoplastic resin are first prepared (step S1). The base member 31 includes, for example, the four base holes 521 each of which is arranged to extend through the base portion 52 in the axial direction. An operation of defining the base holes 521 in the base portion 52 may be carried out either by a manufacturer of the spindle motor 2 or by another party. Note that the insulation sheet 34 does not yet have the sheet holes 341 defined therein at the stage of step S1.

Next, the insulation sheet 34 is fixed to the upper surface of the base portion 52 (step S2). Here, the insulation sheet 34, which is substantially in the shape of a circular arc, is arranged to cover the four base holes 521. An adhesive layer is previously arranged in the lower surface of the insulation sheet 34. Therefore, once the insulation sheet 34 is arranged on the upper surface of the base portion 52, the lower surface of the insulation sheet 34 and the upper surface of the base portion 52 are closely adhered to each other.

Figure 7:
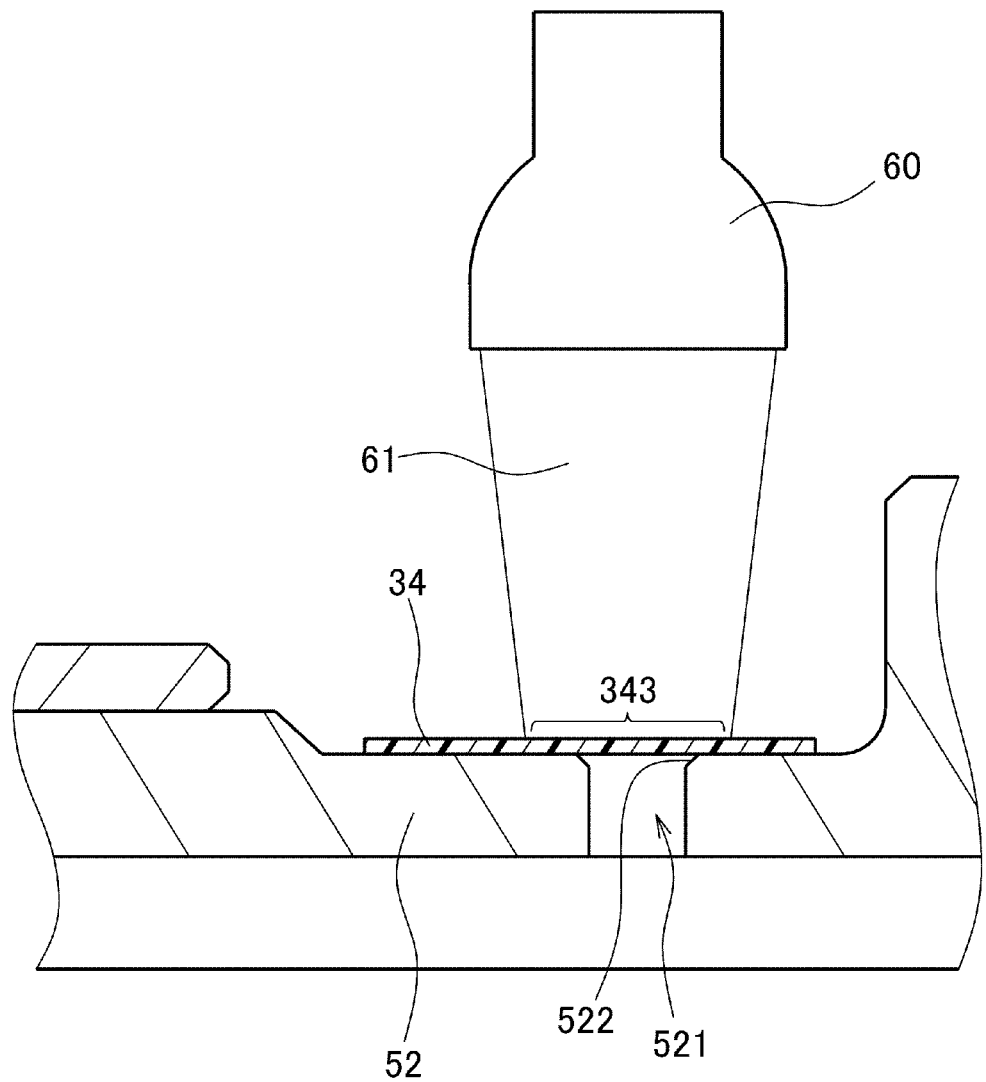
FIG. 7 is a diagram illustrating a situation in which a sheet hole is defined in the insulation sheet according to a preferred embodiment of the present invention.

Next, the sheet holes 341 are defined in the insulation sheet 34 (step S3). FIG. 7 is a diagram illustrating a preferred embodiment of a situation by which each sheet hole 341 is preferably defined in the insulation sheet 34. Here, as illustrated in FIG. 7, a xenon lamp 60, for example, is preferably arranged over the insulation sheet 34. Then, a light 61 is emitted from the xenon lamp 60 toward the upper surface of the insulation sheet 34. The light 61 applies heat to the insulation sheet 34. In the present preferred embodiment, an upper surface of a heating region 343 of the insulation sheet 34 is irradiated with the light 61. The heating region 343 includes a portion of the insulation sheet 34 that is preferably wider than a region of the insulation sheet 34 which coincides with the base hole 521. The heating region 343 of the insulation sheet 34 is heated upon receipt of the light 61 from the xenon lamp 60.

Notice here that the heat is transmitted from the insulation sheet 34 to the base portion 52 through a portion of the heating region 343 of the insulation sheet 34 which does not overlap with the base hole 521, that is, the heat is transmitted by a portion of the heating region 343 which is closely adhered to the upper surface of the base portion 52. This portion of the insulation sheet 34 is accordingly less prone to accumulate heat therein because some of the heat is transmitted out of the insulation sheet 34 to the base portion 52. Thus, this portion of the insulation sheet 34 is therefore melted less easily.

Meanwhile, heat transmission as described above does not occur through a portion of the heating region 343 of the insulation sheet 34 which coincides with the base hole 521, that is, a portion of the heating region 343 which is not in contact with the upper surface of the base portion 52. This portion is accordingly more prone to accumulate heat therein. Thus, this portion of the insulation sheet 34 is therefore melted easily. As described above, the portion of the heating region 343 of the insulation sheet 34 which coincides with the base hole 521 is preferentially melted in step S3. Therefore, it is possible to define the sheet hole 341 with high precision at a position overlapping with the base hole 521 without a need for first ensuring a precise positioning of the heating region 343.

In the present preferred embodiment, each sheet hole 341 is preferably defined by irradiating a portion of the insulation sheet 34 with the light 61 after the insulation sheet is arranged on the upper surface of the base portion 52. Therefore, precise positioning of the base holes 521 and the sheet holes 341 is not necessary when the insulation sheet 34 is arranged on the upper surface of the base portion 52. Therefore, attachment of the insulation sheet 34 to the base portion 52 can be easily accomplished.

When the irradiation with the light 61 is preferably used in the present preferred embodiment, it is easy to accurately set each heating region 343 in the insulation sheet 34. In particular, when a visible light is used as the light 61, it is possible to set the heating region 343 by visually checking. In addition, when the irradiation with the light 61 is used, it is possible to increase temperature of the heating region 343 locally and in a short time. It is therefore possible to quickly define each sheet hole 341 in a minute size. However, it is noted that it would also be possible to heat the heating region 343 using a different device, such as, for example, an electric heating element.

In particular, when the light 61 emitted from the xenon lamp 60 is used as in the present preferred embodiment, it is possible to control the amount of heat of the light 61 more accurately. It is preferable that the diameter of a lamp head of the xenon lamp 60 should be arranged, for example, in the range of about 3 mm to about 7 mm in order to define each sheet hole 341 in a minute size in the insulation sheet 34. In addition, it is preferable that the distance between the xenon lamp 60 and the insulation sheet 34 should be arranged, for example, in the range of about 2 mm to about 15 mm. Moreover, it is preferable that the irradiation time of the light 61 should be arranged, for example, in the range of about 0.5 seconds to about 2 seconds.

It is also preferable that a resin in a dark color such as black should be used for the insulation sheet 34 in order to promote absorption of the heat by the insulation sheet 34. The use of the dark color resin contributes to reducing light reflectivity, and thereby increasing light absorptance. This enables each heating region 343 of the insulation sheet 34 to be more efficiently melted. For example, it is preferable that a material and the color of the insulation sheet 34 should be chosen such that the reflectivity of the insulation sheet 34 with respect to the light 61 with which the insulation sheet 34 is irradiated is less than about 50%.

In addition, the annular edge portion 342 is preferably defined around the periphery of each sheet hole 341 as a result of the local melting of the insulation sheet 34. The axial thickness of the annular edge portion 342 is greater than that of the remaining portion of the insulation sheet 34. This contributes to preventing the insulation sheet 34 from bending around the sheet hole 341. This contributes to more effectively preventing contact between the base portion 52 and the conducting wire 371, which is to be inserted into the sheet hole 341 and the base hole 521 later.

In addition, as illustrated in FIG. 7, the heating region 343 according to the present preferred embodiment is preferably wider than an upper end portion of the inclined surface 522 of the base portion 52. Accordingly, the insulation sheet 34 will also be melted over the inclined surface 522. This leads to a greater diameter of the sheet hole 341 than in the case where the inclined surface 522 is not provided. Moreover, when the annular edge portion 342 is welded to the inclined surface 522, a bend of the annular edge portion 342 is more effectively prevented.

When the annular edge portion 342 is welded to the inclined surface 522, it is apparent that the insulation sheet has been locally melted after the insulation sheet 34 had been fixed to the base portion 52 during the manufacturing procedure.

After step S3 is completed, the circuit board 33 is preferably attached to the lower surface of the base portion 52 (step S4). Here, the circuit board 33 is arranged such that the board hole 331, which is defined in the circuit board 33, overlaps with the base hole 521. Then, the lower surface of the base portion 52 and the upper surface of the circuit board 33 are fixed to each other through the adhesive.

Further, the stator unit 32 is attached to the cylindrical portion 51 of the base member 31 (step S5). Here, the core back 361 of the stator core 36 is fitted to an outer circumferential surface of the cylindrical portion 51, and the core back 361 and the cylindrical portion 51 are preferably fixed to each other through an adhesive or the like, for example. As a result, the coils 37 are arranged over the base portion 52.

Either before or after the attachment of the stator unit 32 to the cylindrical portion 51, the conducting wires 371 which define the coils 37 are preferably drawn downwardly out of the base portion 52. Each of the conducting wires 371 is drawn out downwardly beyond the circuit board 33 through the sheet hole 341, the base hole 521, and the board hole 331.

As described above, the annular edge portion 342 is defined around the periphery of the sheet hole 341. Accordingly, when the conducting wire 371 is passed through the sheet hole 341, a bulge of the annular edge portion 342 can be used as a guide. Specifically, the conducting wire 371 can be guided into the sheet hole 341 along a slope of a surface of the annular edge portion 342. The conducting wire 371 can thus be easily passed through the sheet hole 341. In addition, the fact that the annular edge portion 342 does not bend easily further facilitates an operation of passing the conducting wire 371 through the sheet hole 341.

Thereafter, the lower end portion of each conducting wire 371 is soldered to the lower surface of the circuit board (step S6). The circuit board 33 and the coils 37 are thereby electrically connected to each other. Furthermore, the adhesive is then preferably applied into each base hole 521 and each board hole 331 (step S7). Any opening (i.e., any spatial communication) between the interior and the exterior of the housing 11 is thereby preferably broken off.

While preferred embodiments of the present invention have been described above by way of illustration, it is to be appreciated that the present invention is not limited to the above-described preferred embodiments.

Figure 8:
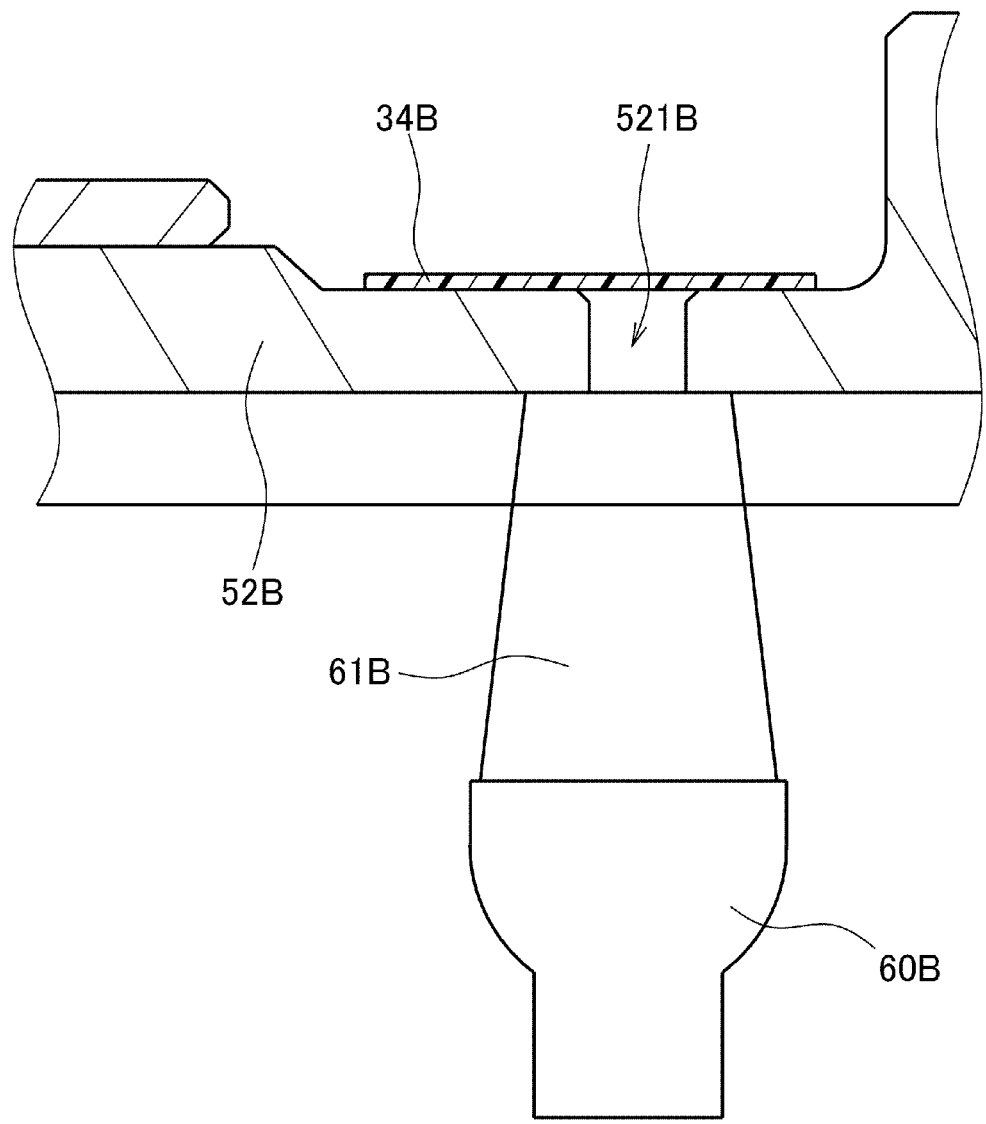
FIG. 8 is a diagram illustrating a situation in which a sheet hole is defined in the insulation sheet according to a preferred embodiment of the present invention.

For example, in step S3 described above, a light 61B may be emitted from a xenon lamp 60B arranged on a lower side of a base portion 52B as illustrated in FIG. 8. In an example of FIG. 8, the light 61B is emitted from the xenon lamp 60B onto a lower surface of an insulation sheet 34B through a base hole 521B. Thus, of the insulation sheet 34B, only a region which coincides with the base hole 521B is irradiated with the light 61B. Accordingly, of the insulation sheet 34B, only the region which coincides with the base hole 521B will be melted to define a sheet hole.

Also, in step S3 described above, a different light source, such as, for example, a halogen lamp, a laser oscillator, or the like, may be used instead of the xenon lamp. The light emitted to the insulation sheet may be either a visible light or an invisible light, such as infrared rays or ultraviolet rays.

Also, close adhesion between the base portion and the insulation sheet may be accomplished either by the adhesive layer arranged in the lower surface of the insulation sheet as in the above-described preferred embodiment, or by another method. For example, the upper surface of the base portion may be arranged to include a groove defined therein, and the insulation sheet may be fitted into the groove to achieve close adhesion between the base portion and the insulation sheet. Also, the insulation sheet may be held between the base portion and another member such as the stator core or the like to achieve close adhesion between the base portion and the insulation sheet.

Also, the insulation sheet may be arranged substantially in the shape of a circular arc in the plan view as in the above-described preferred embodiment, or may be arranged in another shape. For example, the insulation sheet may be arranged in an annular shape in the plan view. Also, the insulation sheet is preferably provided with a dark color as mentioned above, but may alternatively be provided with a light color, if so desired. For example, the insulation sheet may be made of a white resin.

Also, the light irradiation may preferably be used as in the above-described preferred embodiment to heat a portion of the insulation sheet to define each sheet hole, but another method may alternatively be used therefor. For example, the insulation sheet may be locally heated by use of a heat gun or some other heating device. Also, a heat source having a high temperature may be placed in proximity to the insulation sheet to apply a heat to the insulation sheet.

Also, the base portion may be arranged to define a portion of the base member of the housing as in the above-described preferred embodiment, or may be a separate member attached to the base member.

Each base hole may be arranged directly under one of the coils as in the above-described preferred embodiment, or may alternatively be displaced from a position right under any coil. Also, the number of base holes defined in the base portion may be one to three or any other desirable number more than four. Also, a plurality of conducting wires may be passed through the same base hole to thereby be drawn out.

Also, spindle motors according to preferred embodiments of the present invention may be so-called outer-rotor motors, in which the rotor magnet is arranged radially outward of the stator unit, as with the spindle motor according to the above-described preferred embodiment, or may be so-called inner-rotor motors, in which the rotor magnet is arranged radially inward of the stator unit.

Note that the detailed shape of each member may be arranged to differ from that illustrated in the accompanying drawings.

The present invention is applicable to a method of manufacturing a spindle motor, the spindle motor, and a disk drive apparatus including the spindle motor.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method of manufacturing a spindle motor, the method comprising the steps of:
   a) preparing a metallic member including a base portion arranged to extend radially around a central axis extending in a vertical direction, and a base hole arranged to extend through the base portion in an axial direction;
   b) after step a), arranging a sheet made of a resin material on an upper surface of the base portion such that the sheet is fixed to the upper surface of the base portion and covers the base hole;
   c) after step b), applying heat to at least a region of the sheet which coincides with the base hole to define a sheet hole continuous with the base hole in the sheet; and
   d) after step c), arranging a coil over the base portion, and extending a conducting wire defining the coil through the sheet hole and the base hole to be drawn downwardly out of the base portion.

2. The method according to claim 1, wherein in step c), the heat is applied from above the sheet to a heating region of the sheet, the heating region including, and being wider than, the region of the sheet which coincides with the base hole.

3. The method according to claim 2, wherein
   the base portion includes an inclined surface arranged around an upper end opening of the base hole, the inclined surface being arranged to increase in diameter with increasing height; and
   the heating region is arranged to be wider than an upper end portion of the inclined surface.

4. The method according to claim 1, wherein in step c), the heat is applied to the sheet by emitting a light to the sheet.

5. The method according to claim 4, wherein in step c), a xenon lamp is used to emit the light to the sheet.

6. The method according to claim 1, wherein the sheet is black.

* * * * *